March 27, 1934.  M. CORNELL  1,952,311
MEASURING AND DISPENSING APPARATUS
Filed Oct. 2, 1931  6 Sheets-Sheet 1
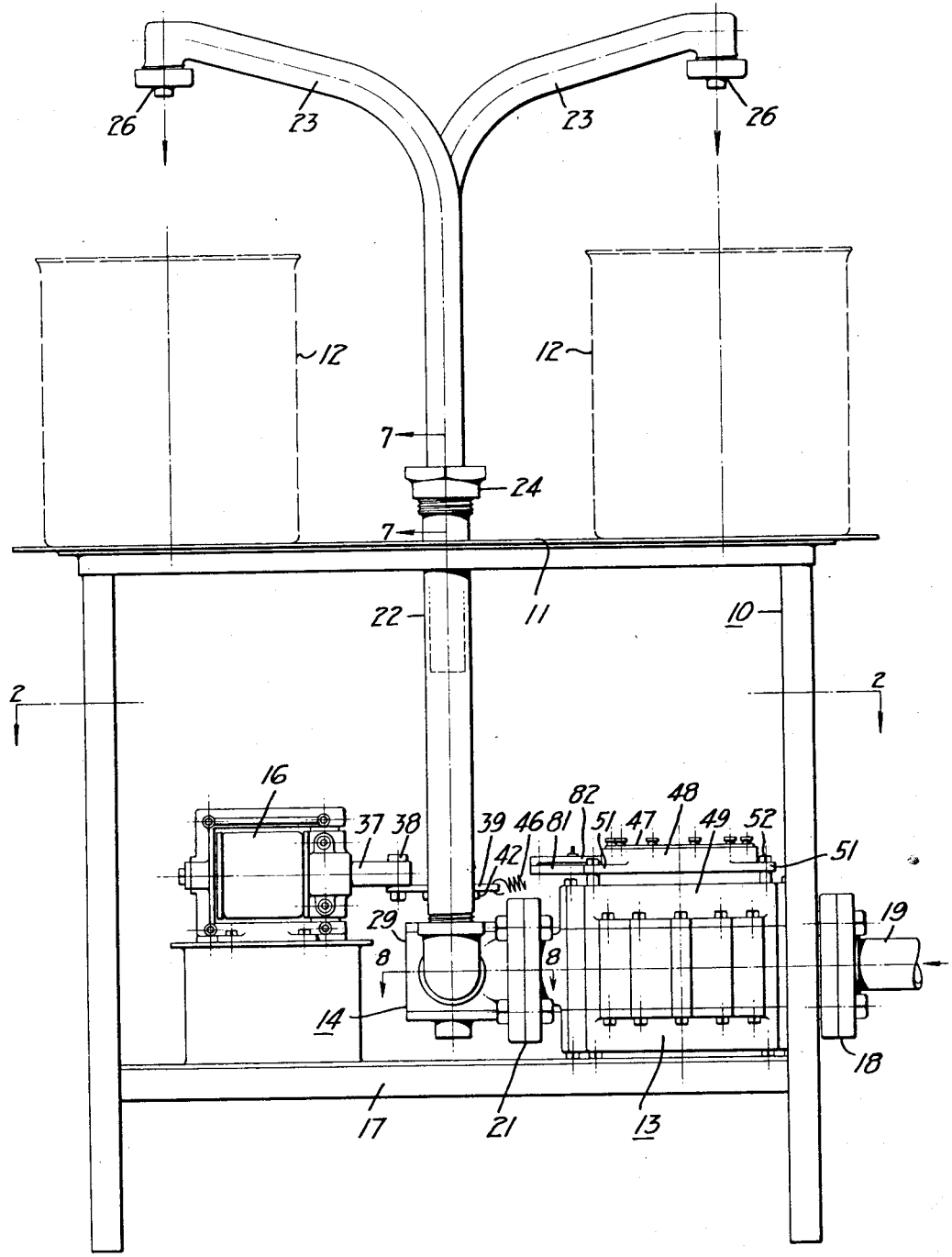
INVENTOR.
Mead Cornell
BY White, Prest, Fiehr & Lothrop
ATTORNEYS.

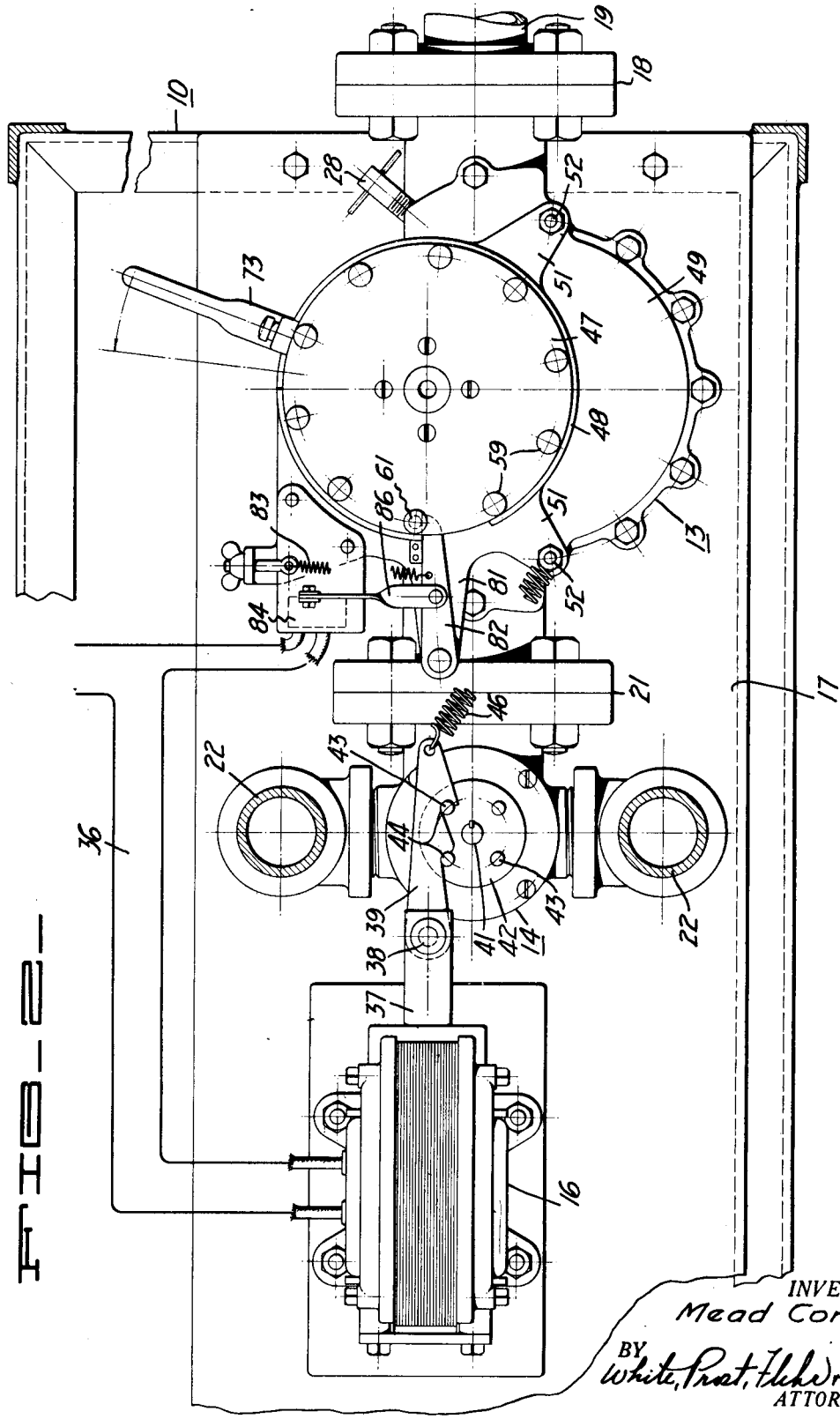

March 27, 1934.   M. CORNELL   1,952,311
MEASURING AND DISPENSING APPARATUS
Filed Oct. 2, 1931   6 Sheets-Sheet 3
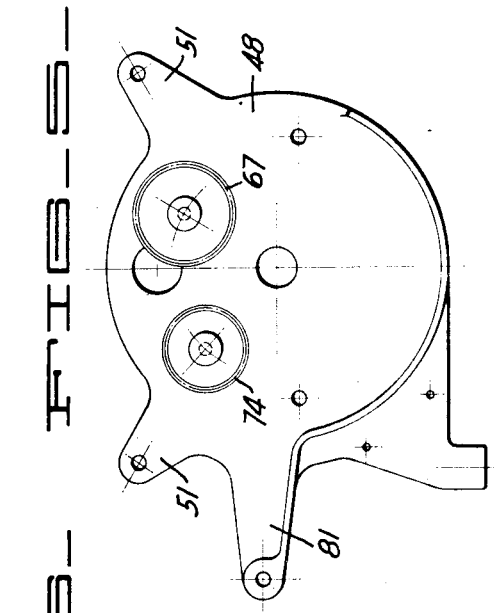
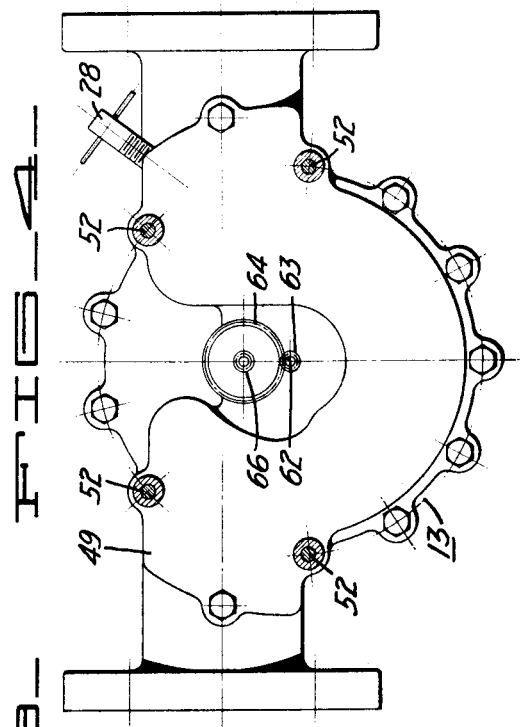
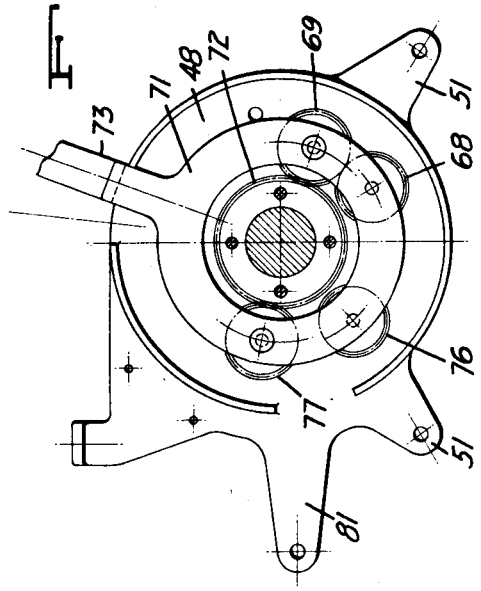
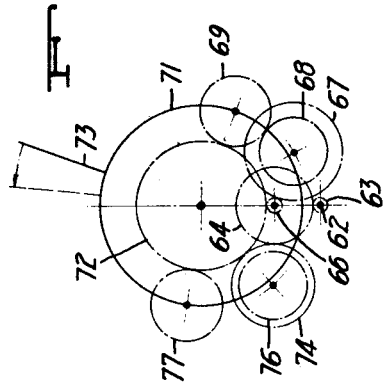
INVENTOR.
Mead Cornell
BY White, Prost, Fleha & Lothrop
ATTORNEYS.

March 27, 1934. M. CORNELL 1,952,311
MEASURING AND DISPENSING APPARATUS
Filed Oct. 2, 1931 6 Sheets-Sheet 4
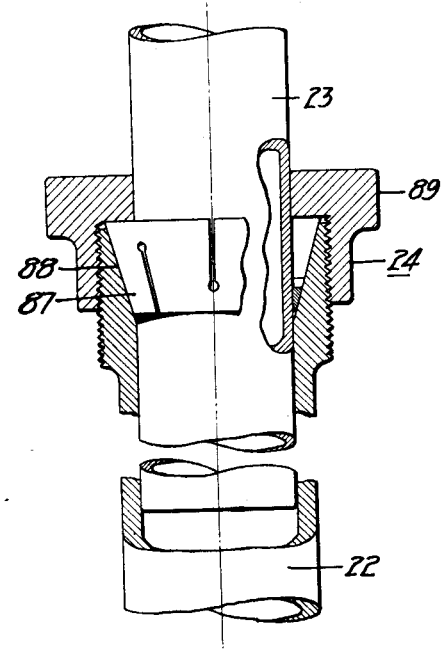
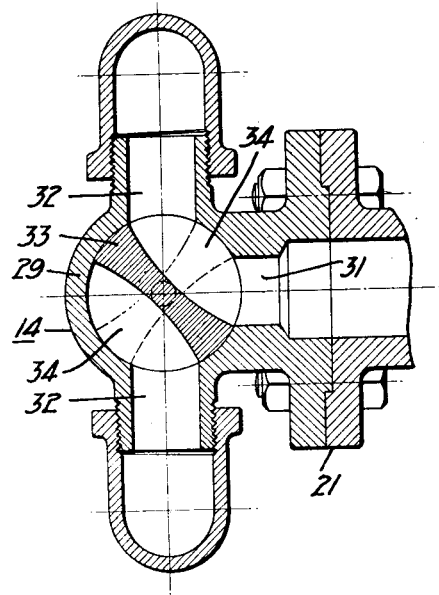
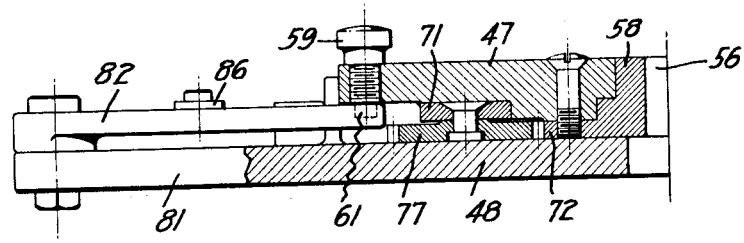
INVENTOR.
Mead Cornell
BY
ATTORNEYS.

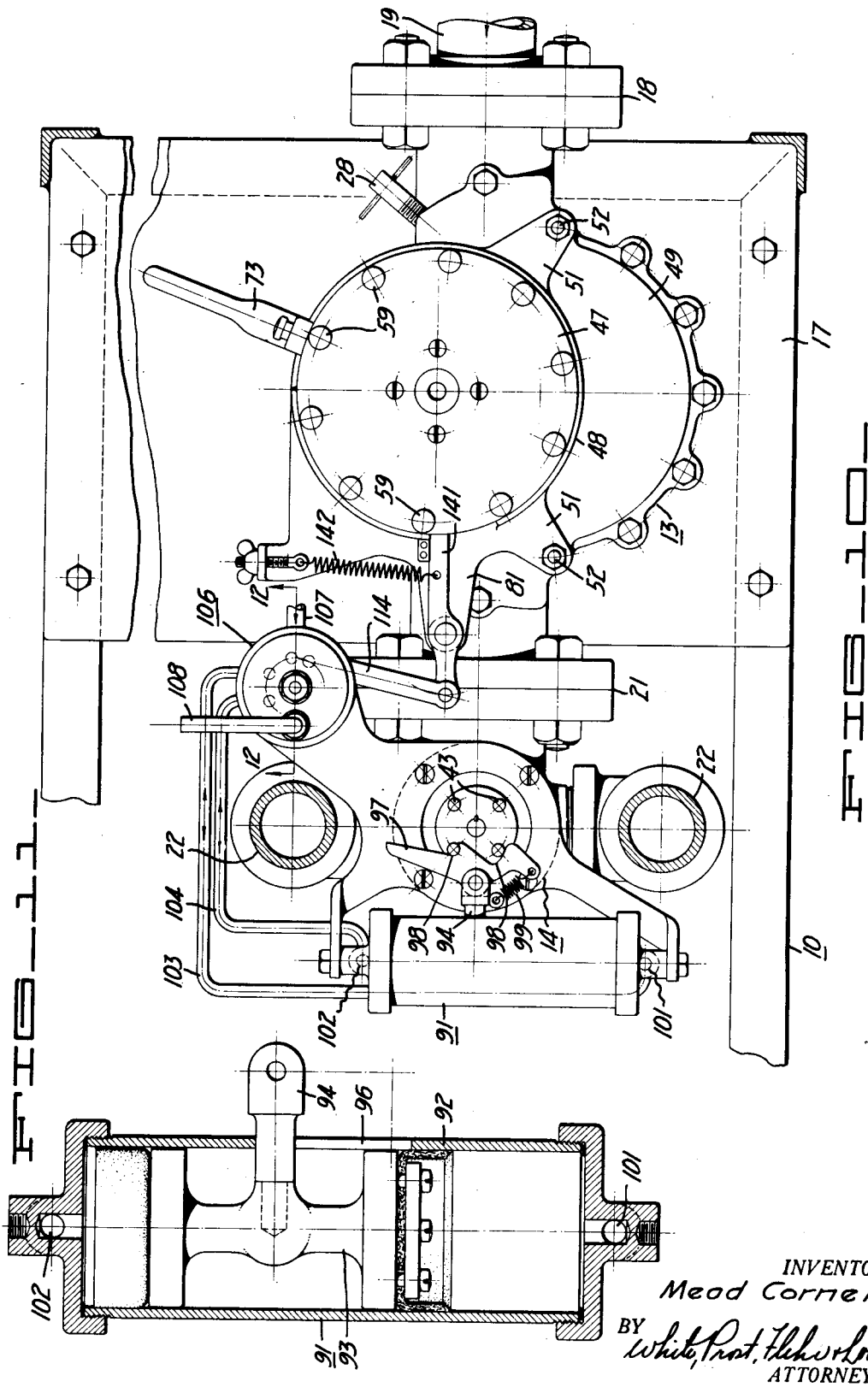

March 27, 1934.      M. CORNELL      1,952,311
MEASURING AND DISPENSING APPARATUS
Filed Oct. 2, 1931      6 Sheets-Sheet 6
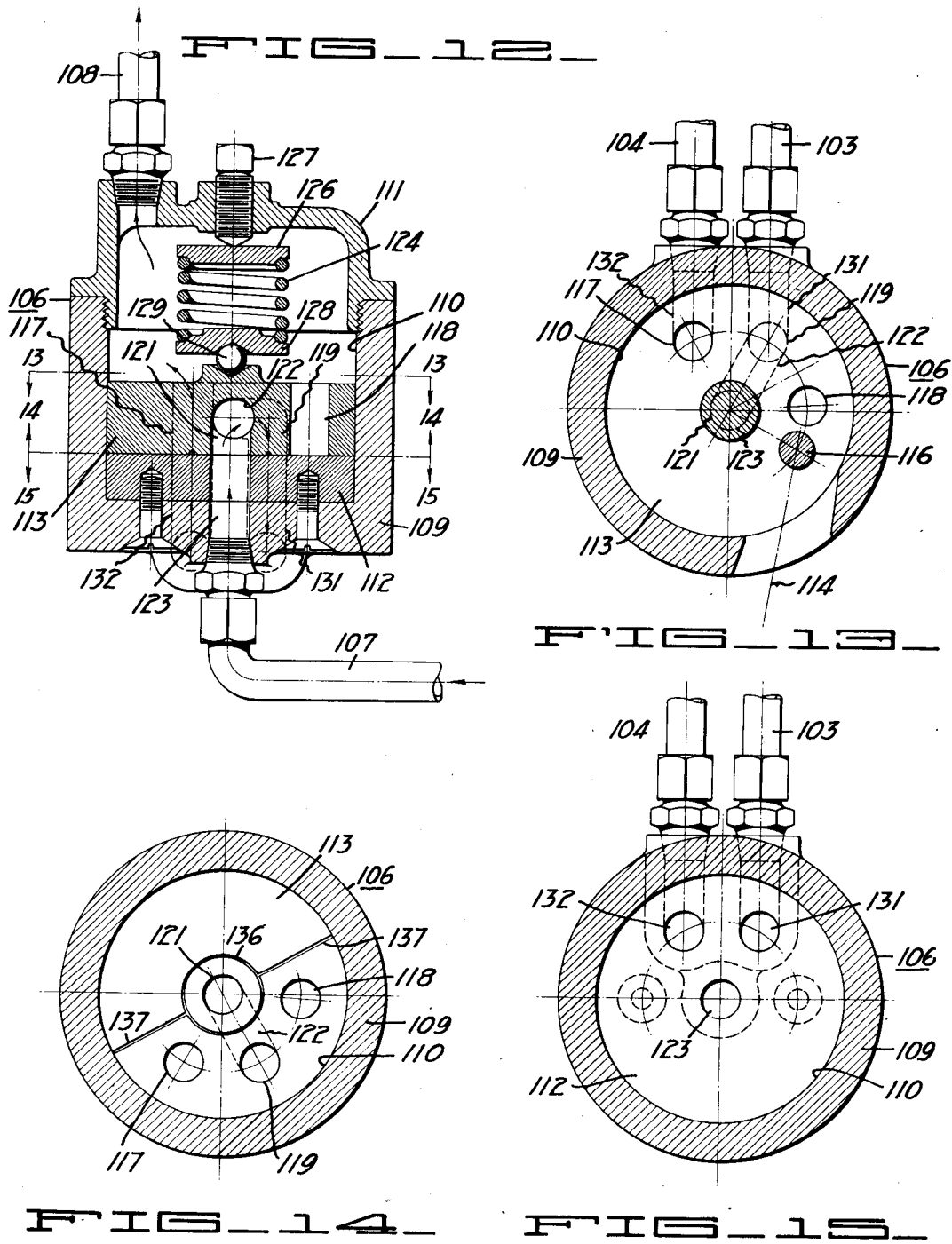
INVENTOR.
Mead Cornell
BY
White, Prat, Fehr & Lothrop
ATTORNEYS.

Patented Mar. 27, 1934

1,952,311

UNITED STATES PATENT OFFICE 1,952,311

MEASURING AND DISPENSING APPARATUS

Mead Cornell, San Francisco, Calif., assignor to The Merrill Company, San Francisco, Calif., a corporation of California Application October 2, 1931, Serial No. 566,562

7 Claims. (Cl. 226—94)

This invention relates generally to apparatus for dispensing measured quantities of various liquids, as for example oil or other hydrocarbon products. It is of value where it is desired to fill barrels, cans or other containers with measured quantities of liquid.

In various industries, liquid products are sold in barrels, cans or other containers of standard sizes. It is highly desirable that apparatus utilized for such filling operations be not only rapid and capable of operation with the least amount of manual attention, but also be capable of ready adjustment to enable filling of containers of different sizes. It is an object of the present invention to devise an apparatus of this character which will perform its functions in such a manner as to enable filling of a maximum number of containers in a given period of time, and which can be readily adjusted to enable filling of containers of different sizes.

It is a further object of the invention to devise a measuring and dispensing apparatus of the above character which will be accurate and reliable in operation, and which can be manufactured and sold at a reasonable price.

Further objects of the invention will appear from the following description in which the preferred embodiments of the invention have been set forth in detail in conjunction with the accompanying drawings. It is to be understood that the appended claims are to be accorded a range of equivalents consistent with the state of the prior art.

Referring to the drawings:

Figure 1 is a side elevational view of apparatus constructed in accordance with my invention.

Fig. 2 is a plan view of the apparatus illustrated in Fig. 1, and taken along the line 2—2 of Fig. 1.

Fig. 3 is a diagrammatic view illustrating the gear train drive between the metering device and the program disc.

Fig. 4 is a plan view of the metering device, illustrating a part of the gear train for driving the program disc.

Fig. 5 is a bottom plan view of a part of the casing serving to mount the program disc, a part of the gear train being shown.

Fig. 6 is a plan view of the gear train for operating the program disc, and showing the element movable between either one of two positions for changing the ratio of the drive.

Fig. 7 is a cross sectional detail taken along the line 7—7 of Fig. 1.

Fig. 8 is a cross sectional detail taken along the line 8—8 of Fig. 1.

Fig. 9 is a fragmentary cross sectional detail illustrating the pins upon the program disc and the manner in which they engage and actuate a lever, which in turn controls actuation of the distributing valve.

Fig. 10 is a view similar to Fig. 2, illustrating a modified form of apparatus utilizing compressed air in place of electrical current.

Fig. 11 is a cross sectional detail illustrating the pneumatic motor device for use with the apparatus of Fig. 10.

Fig. 12 is a cross sectional detail taken along the line 12—12 of Fig. 10.

Fig. 13 is a cross sectional detail taken along the line 13—13 of Fig. 12.

Fig. 14 is a cross sectional detail taken along the line 14—14 of Fig. 12.

Fig. 15 is a cross sectional detail taken along the line 15—15 of Fig. 12.

The invention can be outlined briefly as comprising a suitable metering device of the displacement type, having its inflow side connected to the source of liquid, and having its outflow side connected to two or more delivery pipes thru a suitable distributing valve. Actuating means for this distributing valve, disclosed in the present instance as being either electrical or pneumatic, is controlled by a program member, which in turn is driven by the metering device. By changing the arrangement of pins carried by the program disc, and by adjusting the driving ratio between the program disc and the metering device, the apparatus can be made to discharge various quantities of liquid to the delivery pipe.

Referring to that form of the invention illustrated in Figs. 1 to 9 inclusive, in which electrical means is utilized for actuating the distributing valve, the apparatus as generally installed utilizes a suitable table or stand 10, having a top plate 11 to support the receptacle 12 to be filled. Certain working parts of the apparatus, including a metering device 13, a distributing valve 14, and a distributing valve actuator 16, are carried by the lower horizontal members 17 of the stand 10. Suitable means such as a flange coupling 18 connects the inflow side of metering device 13 with a conduit 19, which in turn connects to the source of liquid to be measured and distributed. Another coupling 21 connects the outflow side of metering device 13 with the distributing valve 14, and the discharge side of this valve connects to a pair of pipes 22 which extend upwardly thru the table top 11. Laterally bent discharge pipes 23 are connected to upstanding pipes 22, thru the slip couplings 24, to be later described. Pipes 23 are provided with suitable nozzles 26 for discharging the liquid to the receptacles 12.

The metering device employed is preferably one of the displacement type having one or more movable members displaced by flow of liquid thru the meter housing. A suitable type of metering device is disclosed in my reissue Patent No. 18,067 granted May 12, 1931, in which gyration of a pair of pistons is caused to effect rotation of a shaft, which in turn is connected to an indicating device. If desired the device can be provided with an internal bypass adjustable by means of screw 28. (Figs. 2 and 4.)

The distributing valve 14 is preferably of the rotary cylindrical plug type in which equal angular movements in the same direction causes successive distribution of liquid to outflow valve passages connected to the pipes 22 and 23. Thus referring to Fig. 8 the distributing valve 14 consists of a casing 29 having an inflow passage 31 communicating with the outflow side of metering device 13, and also provided with outflow passages 32. A rotary cylindrical valve member 33, fitted within casing 29, is provided with ports 34. In the position of valve member 33 shown in Fig. 8, liquid is free to flow from the metering device to one of the passages 32, but when the valve member is turned 90 degrees to the position illustrated in dotted lines in Fig. 8, liquid is distributed to the other passage 32. Thus by turning valve member 33 the full increment of 90 degrees in one direction, liquid is distributed successively to the passages 32 and successively to the discharge pipes 23.

As shown in Fig. 2 the actuator for distributing valve 14 is in the form of a magnetic solenoid having its winding connected to electrical circuit 36, and having a member 37 adapted to retract when energized and projected when the energizing circuit is broken. To operatively connect this electrical solenoid to the rotary valve member 33 of distributing valve 14, member 37 is shown having a pivotal connection 38 with a latch lever 39. The external operating stem 41 of valve member 33 has fixed to its outer end a disc 42, which in turn carries a plurality of circumferentially spaced pins 43. Pins 43 are adapted to be engaged by ratchet teeth 44 formed upon lever 39. Tension spring 46 serves to bias lever 39 in a direction to urge teeth 44 into engagement with pins 43. With the particular form of two way distributing valve described, there are four pins 43 provided and a pair of ratchet teeth 44. Therefore two pins 43 are normally engaged by ratchet teeth 44 as shown in Fig. 2. When current is applied to solenoid 16, member 37 together with lever 39, are retracted, thus causing rotation of disc 42 together with valve member 33 thru an angle of 90 degrees in a counterclockwise direction. When solenoid 16 is demagnetized, lever 39 returns to its normal position shown in Fig. 2, and engages pins 43 preparatory to the next succeeding operation of the distributing valve.

To control circuit 36, whereby predetermined measured quantities of liquid are distributed by valve 14, I provide means driven by metering device 13, including a program disc 47. Program disc 47 is carried upon the face of a flanged plate 48, which in turn is detachably secured to the main housing 49 of the metering device by means of lugs 51 and bolts 52. To describe the mounting of program disc 47, and the gear drive between this disc and the movable members of the metering device which are displaced by flow of liquid thru the meter housing, it is necessary to refer to Figs. 3 to 6 inclusive and 9.

Referring first to Fig. 9 a single stud 56 extends upwardly from the center of plate 48. Disc 47 is provided with a central bushing 58, which is journaled upon stud 56. The peripheral portion of disc 47 carries a plurality of pins 59 which are screw threaded into the disc, and which have their lower end portions 61 projecting below the lower face of the disc. Pins 59 are spaced circumferentially about the disc as shown in Fig. 2, and they are readily removable for a purpose to be presently explained.

The pistons or other movable members of the metering device which are displaced by liquid, serve to directly drive a rotary shaft 62, to which a pinion 63 is fixed. (Fig. 4.) Pinion 63 engages the teeth of a gear 64, which carries another pinion 66. Gear 64 and pinion 66 are journaled to the main housing 49 of the metering device. Pinion 66 engages the teeth of gear 67, which is positioned upon the under side of plate 48 (Fig. 5). Upon the other side of plate 48, the shaft to which gear 67 is fixed also carries a gear 68. Gear 68 meshes with the gear 69, which is journaled to a ring 71. Gear 69 also serves to engage the teeth of a gear 72, which is formed upon bushing 58 of program disc 47. (Fig. 9.) Fixed to ring 71 and extending outwardly therefrom, there is a hand lever 73 (Fig. 6) by means of which ring 71 can be shifted angularly between definite limits. This is for the purpose of shifting the drive ratio between shaft 62 and program disc 47.

Likewise disposed beneath plate 48 and adapted to engage gear 64, there is a gear 74. Carried upon the upper side of plate 48, and fixed to the same shaft upon which gear 74 is mounted, there is a gear 76. Journaled upon ring 71, there is a gear 77, which idles when lever 73 is in the position shown in solid lines in Fig. 6 but which engages the teeth of gear 76 when lever 73 is shifted to its other operating position.

Operation of the gear drive described above can best be understood by reference to Fig. 3. With the position of lever 73 shown in solid lines, the drive from pinion 63 is thru gear 64 to pinion 66, from pinion 66 to gear 67 and gear 68, from gear 68 to gear 69, and from thence to the center gear 72 carried by the program disc. When lever 73 is shifted to the position indicated in dotted lines in Fig. 3, gear 69 idles and the drive to center gear 72 is then from pinion 63 to gear 64, from gear 64 to gears 74 and 76, and from gear 76 thru gear 77 to the center gear 72.

When electrical means is utilized for actuating the distributing valve, pins 59 serve to actuate a contacting device which in turn controls the electrical circuit 36. Thus referring to Fig. 9, plate 48 is provided with an outstanding lug 81 to which a finger 82 is pivoted. The free end of lever 82 is in the path of movement of pins 59, so that it is repeatedly moved a limited angular distance upon rotation of program disc 47. Referring to Fig. 2, finger 82 is biased against a fixed stop by means of a tensioned spring 83. An electrical switch 84 having a suitable fixed mounting, has its movable member connected with finger 82 through a link 86. The contact of switch 84 connect in series with the electrical circuit 36, and the current supply lines. When finger 82 is moved by a pin 59 the contacts of switch 84 are closed to close electrical circuit 36, and to effect energization of the magnetic solenoid 16.

Couplings 24 enable vertical and angular adjustments of discharge pipes 23. As shown in Fig. 7, each coupling can be formed of a split conical sleeve 87, adapted to be forced into a conical socket 88 by the nut 89.

Operation of the complete apparatus described above can be briefly outlined as follows:—Assuming that liquid is flowing into the metering device, program disc 47 is rotated at a rate dependent upon the rate of flow of liquid, and as a pin 59 carried by the disc engages and moves finger 82, magnetic solenoid 16 is actuated to change the distribution of liquid from one pipe 23 to the other. The quantity of liquid delivered at one time through a pipe 23 will be a measured quantity in terms of volume or weight, dependent upon the spacing of pins 59 in program disc 47, and also dependent upon the drive ratio of the gearing serving to drive disc 47. Assuming that a certain amount is delivered with all of the pins 59 in place, twice that amount will be delivered if alternate pins are removed. Likewise ten times the amount delivered when all of the pins are in place, will be delivered if all pins except one are removed. Thus by varying the number of pins 59 upon disc 47 the quantity of liquid can be varied over wide limits, and by varying the spacing of the pins, it is even possible to deliver a larger quantity to one pipe 23 than to the other. A change in the gear drive ratio, which can be effected by shifting the position of lever 73, enables an even greater range of selection of volumes to be delivered. If ten pins are employed it is convenient to have disc 47 driven five times faster in one position of lever 73 than in the other, assuming a certain speed of rotation of shaft 62 of the metering device. The apparatus is of course designed and constructed in such a manner that the operator by noting the position of lever 73 and the arrangement of pins 59, is apprised of the quantities of liquid which will be delivered to pipes 23. With lever 73 in one position and all of the pins in place, the quantity of liquid delivered can be a unit of say five pounds for a given liquid like a lubricant grease. Upon shifting lever 73, twenty-five gallons would be delivered to pipes 23 with the same setting of the pins.

In the modification of the apparatus illustrated in Figs. 10 to 15 inclusive, pneumatic means has been shown for effecting actuation of the distributing valve, in place of electrical means. Thus a pneumatic motive device 91 is disclosed, which consists of a cylinder 92 within which a reciprocating piston 93 is disposed. An arm 94, extending outwardly through the cylinder walls through a slot 96 is fixed to piston 93, and is pivotally connected at its outer end to a ratcheting lever 97. The teeth 98 of ratcheting lever 97 are biased into engagement with pins 43 by the tension spring 99. Ports 101 and 102, communicate with the ends of cylinder 92, and are connected with pneumatic pipes 103 and 104 respectively. Pipes 103 and 104 are also connected to pneumatic valve 106, which has a pipe connection 107 to a source of air under pressure. Pipe 108 also connects to air valve 106 and constitutes an exhaust to the atmosphere.

The details of valve 106 can be better understood by reference to Figs. 12 to 15 inclusive. In its particular form illustrated, it consists of a hollow body 109 having a cylindrical inner bore 110, which is enclosed by cover plate 111. A disc 112 fixed within body 109 has its inner surface machined to form a flat valve seat. A rotatable valve member 113 cooperates with the inner face of disc 112, and is adapted to be actuated by a lever 114, one end of which is connected to valve member 113 by pin 116. Valve member 113 is provided with two spaced ports 117 and 118 extending through the same, with a port 119 intermediate ports 117 and 118, and also with a central port 121. Ports 121 and 119 are connected by a radial passageway 122. Body 109 and disc 112 have a central passage 123 which communicate between port 121 and pipe 107.

Compression spring 124 is employed for urging valve member 113 into contact with disc 112. The upper end of spring 124 is seated upon a disc 126, the central portion of which is engaged by the lower end of a set screw 127. The lower end of spring 124 is seated upon a disc 128, which applies thrust to the center of valve member 113 through a hard metal ball 129. Ports 131 and 132 communicate with pipes 103 and 104, and also through the upper face of disc 112. In one position of valve member 113 indicated in Fig. 13, port 119 is brought into registry with port 131, so that air under pressure is discharged through pipe 103. At the same time port 117 is brought into registry with port 132 so that pipe 104 is vented to the atmosphere. In the other limiting position of valve member 113, port 119 is brought into registry with port 132 so that air under pressure is discharged into pipe 104, and at the same time pipe 103 is vented to the atmosphere through port 131 and port 118. The introduction of air under pressure through one or the other of pipes 103 or 104, effects reciprocation of piston 93, and operation of ratcheting lever 97.

The lower face of valve member 113 is interrupted by a circular groove 136 which is connected to the periphery of the valve member by radial grooves 137. These grooves limit the effective pressure area of the valve member so that the spring 124 need not exert great force to hold the valve member upon its seat.

As shown in Fig. 10 link 114 has its outer end pivotally connected to a finger 141, which is biased against a fixed stop by spring 142, and which corresponds to finger 82 of Fig. 2.

Operation of the apparatus described above with reference to Figs. 10 to 15 inclusive is substantially the same as the mode of operation previously described with respect to Figs. 1 to 9 inclusive, except that when finger 141 is engaged and moved by a pin 59, pneumatic valve 106 is conditioned to cause air under pressure to be supplied to actuating device 91, which in turn reciprocates ratcheting lever 97. Ratcheting lever 97 effects actuation of the distributing valve 14 in the same manner as the electrical means previously described.

I claim:

1. In a liquid measuring and dispensing apparatus, a metering device having its inflow side adapted to be connected to a source of liquid, a distributing valve having an inflow passage connected to the outflow side of the metering device and having a plurality of outflow passages, a rotary program member adapted to be driven by the meter, whereby the rate of movement of said member is directly proportional to the volumetric rate of flow of liquid through the metering device, and means under control of said program member for effecting operation of said distributing valve, whereby measured quantities of liquid are delivered successively to said outflow passages.

2. In a liquid measuring and dispensing apparatus, a metering device having its inflow side adapted to be connected to a source of liquid, a distributing valve having an inflow passage connected to the outflow side of the metering device and having a plurality of outflow passages, separate discharge pipes connected to the outflow passages of said valve, a rotary program disc driven by said metering device whereby angular rotation of said disc is proportionate to the volumetric rate of flow of liquid through the metering device, and means controlled by rotation of said program disc for actuating said distributing valve, whereby measured quantities of liquid are discharged successively through said pipes.

3. In a liquid measuring and dispensing apparatus, a metering device of the volumetric displacement type having its inflow side adapted to be connected to a source of liquid, a distributing valve having an inflow passage connected to the outflow side of the metering device and having a plurality of outflow passages, a plurality of separate discharge pipes connected to the outflow passages of said valve, a rotary program disc, a mechanical drive connection between said program disc and said metering device, a plurality of pins detachably secured to said disc and spaced circumferentially about the same, a movable member positioned in the path of movement of said pins, and means controlled by said last named member for actuating said distributing valve, whereby predetermined measured quantities of liquid are distributed successively to said pipes.

4. In a liquid measuring and dispensing apparatus, a metering device of the volumetric displacement type having its inflow side adapted to be connected to a source of liquid, said device including a shaft which is rotated upon flow of liquid through the device, a distributing valve having an inflow passage connected to the outflow side of the metering device and naving a plurality of outflow passages, separate discharge pipes connected to the outflow passages of said valve, a movable program member, an adjustable ratio gear drive between said program member and the rotary shaft of said metering device, and means controlled by movements of said program member for effecting operation of said distributing valve, whereby measured quantities of liquid are delivered successively to said discharge pipes.

5. In a measuring and dispensing apparatus, a metering device of the volumetric displacement type including a shaft adapted to rotate in direct proportion to the volume of liquid flowing through the device, a rotary program disc carried by the housing, a gear train connecting said disc with said shaft, said gear train including a member movable between either one of two positions to effect a change in the driving ratio, a plurality of pins carried by the disc and spaced circumferentially of the same, and means controlled by said pins for effecting selective distribution of liquid discharged from the metering device.

6. In a liquid measuring and dispensing apparatus, a metering device having its inflow side adapted to be connected to a source of liquid, a distributing valve including a rotatable valve member, said valve having an inflow passage connected to the outflow side of the metering device and having a plurality of outflow passages, a plurality of separate discharge pipes connected with said outflow passages, said valve member being adapted to supply liquid to said pipes successively upon equal angular movements of the same in the same direction of rotation, ratcheting means for rotating said valve member by angular increments in the same direction, and means controlled by said metering device for actuating said ratcheting device in accordance with the volume of liquid flowing through the metering device.

7. In a liquid measuring and dispensing apparatus, a metering device having its inflow side adapted to be connected to a source of liquid, a distributing valve including a rotatable valve member, said valve having an inflow passage connected to the outflow side of the metering device and having a plurality of outflow passages, a plurality of separate discharge pipes connected with said outflow passages, said valve member being adapted to supply liquid to said pipes successively upon equal angular movements of the same in the same direction of rotation, ratcheting means for rotating said valve member by angular increments in the same direction, and means controlled by said metering device for actuating said ratcheting device in accordance with the volume of liquid flowing through the metering device, said last means including a program member driven by the metering device.

MEAD CORNELL.